J. G. GOODHUE AND H. L. TRUBE.
PREPARATION OF FOOD AND FOOD PRODUCTS.
APPLICATION FILED OCT. 4, 1917.
1,365,909.
Patented Jan. 18, 1921.
3 SHEETS—SHEET 3.
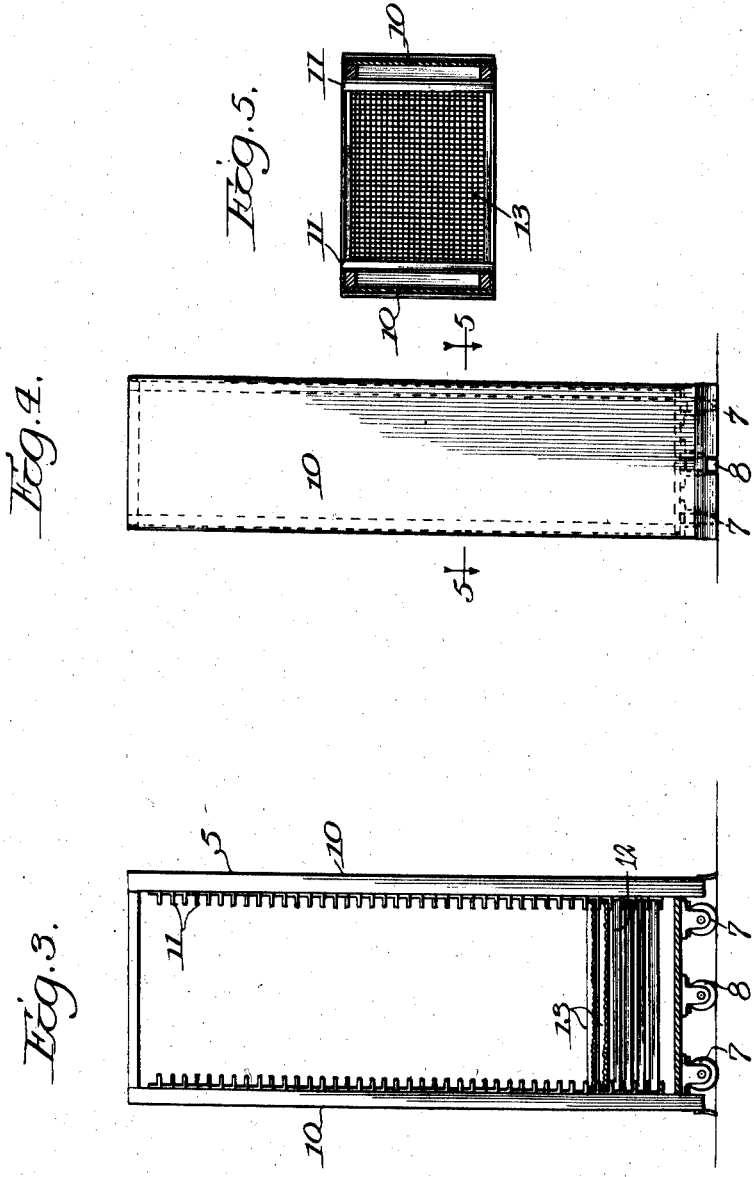

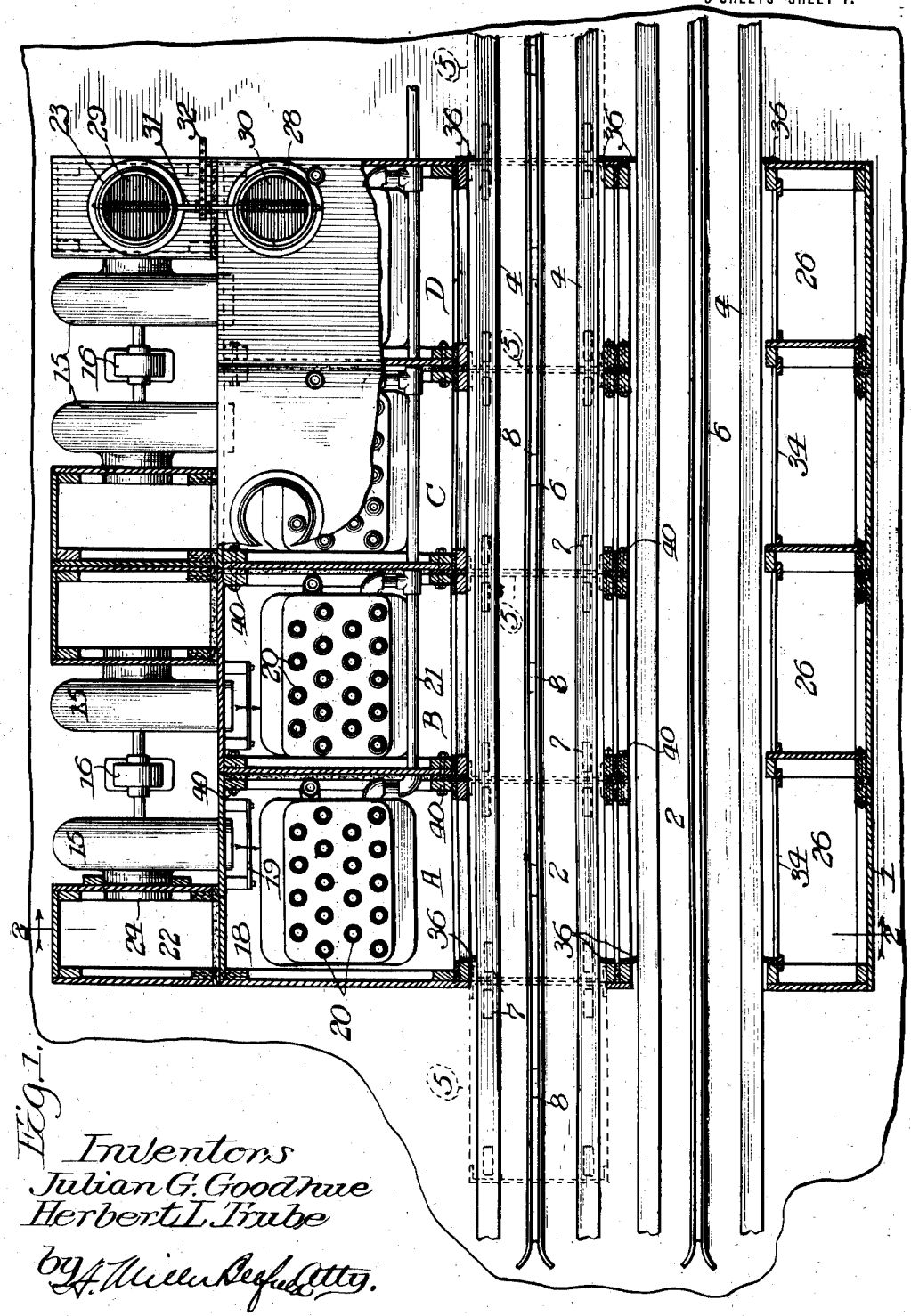

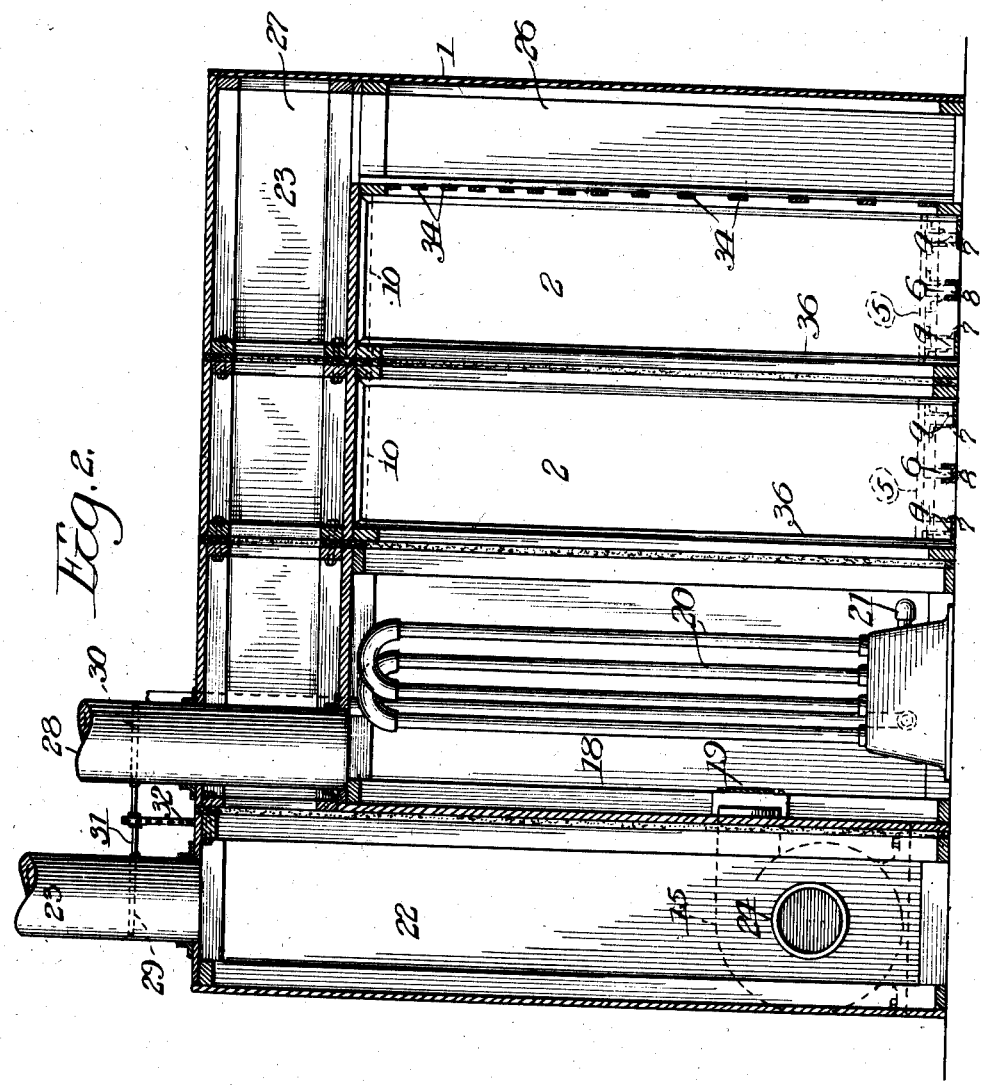

UNITED STATES PATENT OFFICE.

JULIAN G. GOODHUE AND HERBERT L. TRUBE, OF CHICAGO, ILLINOIS; SAID TRUBE ASSIGNOR TO SAID GOODHUE.

PREPARATION OF FOOD AND FOOD PRODUCTS.

1,365,909.     Specification of Letters Patent.     Patented Jan. 18, 1921.

Application filed October 4, 1917. Serial No. 194,716.

*To all whom it may concern:*

Be it known that we, JULIAN G. GOODHUE and HERBERT L. TRUBE, citizens of the United States, residing at Chicago, in the county of Cook and State of Illinois, have invented a certain new and useful Improvement in the Preparation of Food and Food Products, of which the following is a full, clear, concise, and exact description, reference being had to the accompanying drawings, forming a part of this specification.

Our invention relates to the preparation of food and food products.

One of the objects of the invention is to provide a process and an apparatus by which various food articles may be treated so as to reduce the amount of moisture therein, thereby reducing the bulk of such articles to facilitate preservation and transportation.

Another object of the invention is to obtain a high degree of efficiency and a satisfactory regulation and control of the process and apparatus.

Another object of the invention is to facilitate the introduction and removal of the material to be treated.

Further objects of the invention will appear hereinafter.

In the accompanying drawings Figure 1 is a plan view of an apparatus embodying our present invention;

Fig. 2 is a vertical section taken on line 2—2 in Fig. 1;

Fig. 3 is a side elevation of a car or truck forming a part of the apparatus;

Fig. 4 is an end elevation of the same; and

Fig. 5 is a horizontal section taken on line 5—5 in Fig. 4.

Referring to the drawings, the apparatus shown involves a casing or housing 1 which may be of various forms or shapes, but is preferably shown with vertical side walls and horizontal top. There are formed in this housing a plurality of passageways 2—2, the number of which may vary, two being shown. These passageways are adapted to receive cars or trucks such as shown in Figs. 3, 4 and 5, and to such end tracks 4—4 are shown at the bottom of the passages 2—2. As a simple and practical arrangement for accurately directing the movement of the cars or trucks 5 along the tracks 4 and through the passageways 2, a center rail 6 is provided in each passage 2 and each car 5 is provided with center wheels 7—7 adapted to fit in the groove or slot of the rail 6, said cars in such case being provided with side wheels 8—8 adapted to travel on the rails 4—4. By such arrangement the cars 5 may be moved along the rails 4—4, entering the passageways 2 at one end and leaving the same at the other end of the apparatus.

Each car 5 is constructed so as to hold material to be treated in the apparatus. As a preferred arrangement these cars are made as shown in Figs. 3, 4 and 5, but of course it is obvious that the construction may be varied. The construction of car shown has solid end walls 10—10, and a series of side supports or ledges 11—11, on which are mounted trays 12—12, the latter being arranged to slide horizontally of said supports or ledges 11. On these trays 12 are arranged masses of material 13 which are to be treated in the apparatus. It will be observed that there is a small space between each of these trays 12—12 and that inasmuch as both sides of the cars 5 are open air may pass from side to side between said trays and over and under the material 13.

As shown in Fig. 1, there is room on each pair of rails 4—4 for a plurality of cars to stand within the apparatus,—that is to say within the casing or housing 1. The apparatus may be so constructed that this number of cars can be varied as desired. In addition to the four cars within the apparatus there is shown in Fig. 1 a fifth car at the left of the four inclosed cars, which fifth car is understood to be in process of being loaded with material to be treated, after which it is pushed into the apparatus and the car at the farthest end is pushed out of the same. In this way material to be treated is fed or introduced into the apparatus and withdrawn from the same.

There are also provided blowers or fans 15—15 or other suitable devices for producing a current of air or other gas. Four of these blowers or fans 15 are shown, one for each transverse row of cars or trucks the chambers or passages 2. These blowers or fans 15 are understood to be driven by suitable motive power, as for example electric motors 16—16. As shown in Figs. 1 and 2, each of these blowers 15 forces air or gas into the lower portion of a heating chamber 18, preferably against a baffle plate 19 by which it is distributed in said chamber. Within each of these heating chambers 18 is a heating device, as for example, the steam radiator 20 which is understood to be suitably connected with a source of steam supply by means of a pipe connection 21. At the side of each blower 15 is a supply chamber 22 to which is connected an inlet or supply pipe 23 for air or other suitable gas. At the lower end of this chamber 22 is an outlet or connection 24 to the blower, whereby air or gas supplied through the pipe 23 may pass into the chamber 22 and thence to the blower, and thence into the heating chamber 18 from which latter it may pass directly to two cars 5, passing through first one and then the other. After passing through said cars it enters an outlet chamber 26, thence passing upwardly to an outlet passage 27 formed at the upper portion of the casing or housing 1. From this passage 27 the air or gas may pass back into the supply chamber 22. Thus there are formed a plurality—in this case four—of independent heating chambers and circulatory systems, each one having a blower or fan and a radiator and each one circulating the heated air or gas through two cars standing side by side on the two tracks. These several heating systems are maintained at different temperatures, by properly regulating the steam in the radiators 20. The left hand system A (Fig. 1) has the lowest temperature and the others, B, C and D, are successively higher. For example, for certain classes of work system A may be 110 degrees, system B, 120 degrees, system C, 130 degrees, and system D, 140 degrees.

An outlet pipe 28 is connected with each heating chamber 18, permitting the escape of a certain amount of air or gas within each heating chamber. This allows some of the air or gas which has absorbed some of the liquid from the material under treatment to escape to be replaced by fresh air or gas. The inlet and outlet pipes 23 and 28 are provided with dampers 29 and 30, respectively, and these are preferably controlled so as to operate similarly to open and close the pipes 23 and 28 to the same extent, by means of a rotary shaft or spindle 31 controlled by a sprocket chain 32 which is understood to be connected or provided with suitable controlling, manual or otherwise. In order to afford a better distribution of air in passing across the chambers or passages 2—2, there are preferably provided a series of baffle plates 34 (Fig. 2), arranged at intervals between the chamber 26 and adjacent passages 2. These baffle plates 34 are preferably arranged nearer together at the upper part of the series.

In order to provide an air tight joint between the cars 5 and the casing walls, strips 36 of felt or other suitable material are provided at the edges of the end openings of the passageways 2.

The operation of the apparatus is as follows: Material to be treated is loaded upon cars 5 and these are pushed along the tracks 4 into the apparatus. This material is in a partly solid and partly liquid condition, such for example as fruits, vegetables and the like in a more or less prepared condition. The blowers 15 are set in operation and air or other gas is forced into and through the heating chambers 18 and thence through the four independent circulatory systems, each including two cars 5—5, the heated current in each case returning through passages 22 to the respective blowers. A continual circulation is maintained in this way in each system. A small portion of the heated air or gas is permitted to escape from each system through the outlet pipes 28, and a corresponding amount is permitted to enter through the inlet pipes 23. This is controlled by the dampers 30 and 29, and this control it will be seen, regulates the humidity in the four circulatory systems A, B, C and D, the humidity being greater or less according as the dampers admit less or more air or gas through the inlet pipes 23. Preferably the humidity is highest in the first system A, and successively lower in the subsequent systems.

In this way the material in the cars is deprived of its moisture, being dried to some extent when the cars 5 are in heating system A, and being dried more and more in other systems B, C and D. At certain intervals a car with fresh material is pushed into the apparatus, and by so doing the other cars are advanced one step to the right. This is repeated again and again, a new car being introduced and the other cars being advanced to have their material more and more dried. As each car with fresh material is pushed in, the endmost car (in system D) is pushed out, its material being in a finally dried condition. Thus there is a continual advancement of the material to be treated by the movement of the cars along the tracks and there is also a continual drying operation by means of the four currents of heated air or gas circulating through and acting upon the material in the cars in the four drying systems. The operation may be controlled by controlling the speed of advancement of the material under treatment, by regulating the temperature and speed of the drying currents, by regulating the humidity by means of the dampers 29 and 30. Thus varying conditions of atmosphere and climate may be taken care of, as well as various type of material and various kinds of products from the same.

The preferred construction is what may be called a "knock-down" or "collapsible" construction. According to this the various parts of the casing 1 and the parts associated therewith are made detachable and fasten together by bolts or similar devices. For example, the several casings forming the inlet chambers 22 may be made detachable from the main casing 1. The blowers 15 may be readily detached from said casings and from the driving motors 16. The sections of casing containing the radiators 20 are also made separable or detachable and secured in position by cross bolts 40. Also the sections of casing forming the car passage or chamber 2 nearest the radiators 20, are made separately detachable and similarly held in position by bolts. Also the sections of casing forming the other car chamber 2 and the return chambers 26 are made separately detachable. Thus the structure is divisible into four parts, each way, being divisible on one side into the following parts; the casings forming the chambers 22, the casings forming the chambers 18, the casings forming the first car passage 2, and the casings forming the second car passage 2 and adjacent passage 26, and being divisible in four sections the other way by separating various casings one from another along the lines between the four circulatory systems heretofore mentioned. In this way the structure can be taken apart and shipped in a knock-down condition, thereby permitting easy and ready transportation.

This separable construction also permits the apparatus to be changed in size and capacity almost without limit. For example, additional tracks may be added by inserting sectional members such as those containing the first tracks 4, that is the tracks 4 nearest the radiators 20. As many sections of this kind with their tracks may be introduced as desired, thus increasing the capacity as much as desired by the addition of further tracks for additional cars. The endmost sections containing the chambers 26 will be put in position at the ends of the added sections. Furthermore, the capacity of the apparatus will be changed or enlarged by the addition of further circulatory systems, each consisting of a blower or similar device, a radiator or other heating device and the passages for circulating the heated currents from said devices through the cars and back again. Such additional sections may be inserted between the various casings forming the transversely arranged circulatory systems. Preferably such sections would be introduced at the very middle of the apparatus, by putting one or more series of transverse sections between the casing members forming the systems B and C. Thus additional heating and circulatory systems may be added and their temperatures varied as desired.

It will be seen that in the operation of the apparatus the material to be treated is not subjected to a high temperature at first, but is subjected at first to a relative low temperature in the drying system A, and that the subsequent temperatures are moderately increased, the highest temperature being reached last where it is most effective. This prevents any incrustation of the food, such as might take place by immediately subjecting it at first to a high temperature. It also prevents destroying the quality of the food. Furthermore, the humidity may be relatively high in the first chamber and relatively low in the other chambers, and this will also help to prevent incrustation.

It will be understood that various modifications and changes may be made without departing from the spirt of the invention.

What we claim is:

1. An apparatus of the class specified comprising means whereby the material to be treated may be advanced, means for inducing a plurality of drying currents for treating different portions of said material, passages for conveying said currents to the material to be treated and back again, and independent heating devices for independently heating said currents.

2. An apparatus of the class specified comprising a housing containing partitions dividing said housing into a plurality of transversely extending compartments, a track extending crosswise of said compartments through the same, cars adapted to be mounted on said track and having a length equal to the width of said compartments whereby one car may be located in each compartment, said cars being adapted to carry material to be treated, and means for inducing a forward and back circulation of drying currents in said several compartments.

3. An apparatus of the class specified comprising a housing containing a plurality of tracks arranged side by side, partitions extending crosswise of said tracks to form transverse chambers each containing sections of said tracks, cars provided with means for exposing the material to be treated, means for circulating drying currents through said chambers and the cars therein, and means for heating said currents of gas to different temperatures.

4. An apparatus of the class specified comprising a housing containing a plurality of tracks arranged side by side, partitions extending crosswise of said tracks to form transverse chambers each containing sections of said tracks, cars provided with means for exposing the material to be treated, means for circulating drying currents through said chambers and the cars therein, and means for heating said drying currents to successively higher temperatures.

5. An apparatus of the class specified comprising a housing containing a plurality of tracks arranged side by side, partitions extending crosswise of said tracks and forming independent circulatory systems, cars on said tracks being arranged in said systems, means for circulating gas through said systems and heating devices for heating the gas circulated by said circulating means.

6. An apparatus of the class specified comprising a housing having a plurality of chambers each adapted to receive a plurality of holders for the material under treatment, holders for material arranged in said chambers, the sides of said holders being open, means for circulating heated gas through said chambers and the material holders therein and means forming return passages from said receptacles to said circulating means.

7. An apparatus of the class specified comprising a housing having a plurality of chambers each adapted to receive a plurality of holders for the material under treatment, holders for material arranged in said chambers, the sides of said holders being open, means for circulating heated gas through said chambers and the material holders therein and means forming return passages from said receptacles to said circulating means, said return passages being located above said material holders.

8. An apparatus of the class specified comprising a housing having a plurality of chambers each adapted to receive a plurality of holders for the material under treatment, holders for material arranged in said chambers, the sides of said holders being open, means for circulating heated gas through said chambers and the material holders therein and means forming return passages from said receptacles to said circulating means, said housing being composed of parts detachably secured together.

9. An apparatus of the class specified comprising a housing consisting of a plurality of sections of casing detachably secured together, said sections forming parallel circulation chambers for heated gas currents, said sections also providing one or more chambers adapted to contain a plurality of receptacles for material to be treated.

10. An apparatus of the class specified comprising a housing having interior partitions extending parallel with one another and dividing said housing into transverse chambers and circulatory systems for the circulation of independent currents of heated gas, and also forming one or more chambers for the reception of receptacles for holding the material to be treated, said receptacles being adapted to be situated in the successive aforesaid circulatory systems, heating devices for heating the circulatory currents in said systems and means for inducing circulation of such heated currents.

11. An apparatus of the class specified comprising a housing having interior partitions extending parallel with one another and dividing said housing into transverse chambers and circulatory systems for the circulation of independent currents of heated gas, and also forming one or more chambers for the reception of receptacles for holding the material to be treated, said receptacles being adapted to be situated in the successive aforesaid circulatory systems, heating devices for heating the circulatory currents in said systems, blowers for inducing circulation of such heated currents, inlet pipes for supplying fresh gas to said systems, and outlet pipes for permitting the escape of gas therefrom.

12. An apparatus of the class specified comprising a housing having interior partitions extending parallel with one another and dividing said housing into transverse chambers and circulatory systems for the circulation of independent currents of heated gas, and also forming one or more chambers for the reception of receptacles for holding the material to be treated, said receptacles being adapted to be situated in the successive aforesaid circulatory systems, heating devices for heating the circulatory currents in said systems, means for inducing circulation of such heated currents, inlet pipes for supplying fresh gas to said systems, outlet pipes for permitting the escape of the same therefrom, and means for regulating said inlet and outlet pipes so as to cause a substantially equal admission and escape of gas in each system.

13. An apparatus of the class specified comprising a housing containing two chambers or passages for cars, tracks in said passages, cars on said tracks, said cars having closed end walls and open sides, radiators at one side of said cars, blowers arranged to direct air to said radiators, and through the same into and through said cars, return passages from the far side of said cars back to said blowers, and supply pipes for supplying said blowers, escape pipes and means for correspondingly controlling said supply and escape pipes.

14. A car comprising closed ends provided with horizontally extending ledges, said car having its sides open and trays for the material to be treated mounted for sliding movement upon said ledges, said car being provided with wheels arranged at the corners of a quadrilateral, and means for closing the space below the lower edges of said ends.

15. A process of the class specified consisting in continually advancing the material under treatment, and subjecting different portions of said material to independent drying currents of different humidities.

16. A process of the class specified which consists in advancing the material under treatment, and subjecting successive portions of such material to independent drying currents of succesively higher temperatures and of lower humidities.

17. A process of the class specified which consists in advancing the material under treatment, subjecting successive portions of said material to the influence of independent drying currents of different temperatures and humidities and regulating the temperature and humidity of said currents.

18. A process of the class specified which consists in advancing the material to be treated in a plurality of columns, and subjecting corresponding portions of said columns to different temperatures.

19. A process of the class specified which consists in advancing the material to be treated in a plurality of columns, and subjecting corresponding portions of said columns to different temperatures and also to different humidities.

20. An apparatus of the class described comprising a housing, a track in said housing, cars mounted on said track, said cars being provided with means for supporting the material to be treated in an exposed condition, and means for subjecting the material on said cars to the influence of independent drying currents of successively lower humidities.

In witness whereof, we hereunto subscribe our names this 2nd day of October, A. D. 1917.

JULIAN G. GOODHUE.
HERBERT L. TRUBE.